(12) United States Patent
Kobayashi

(10) Patent No.: US 7,059,317 B2
(45) Date of Patent: Jun. 13, 2006

(54) CONVEYER OVEN

(75) Inventor: Toshihiro Kobayashi, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/790,305

(22) Filed: Mar. 1, 2004

(65) Prior Publication Data

US 2004/0177769 A1    Sep. 16, 2004

(30) Foreign Application Priority Data

Mar. 12, 2003 (JP) .............................. 2003-066283

(51) Int. Cl.
*F24C 15/32* (2006.01)
(52) U.S. Cl. .................................................. 126/21 A
(58) Field of Classification Search ............ 126/19 R, 126/21 A; 34/223, 225; 99/443 C; 219/388; 426/505
See application file for complete search history.

(56) References Cited

U.S. PATENT DOCUMENTS

| | | | |
|---|---|---|---|
| 4,043,259 A * | 8/1977 | Sato ............................ 99/353 |
| 4,462,383 A | 7/1984 | Henke et al. |
| 4,473,004 A * | 9/1984 | Wells et al. ................ 99/386 |
| 4,556,043 A | 12/1985 | Bratton |
| 4,591,333 A | 5/1986 | Henke |
| 4,626,661 A | 12/1986 | Henke |
| 4,701,340 A | 10/1987 | Bratton et al. |
| 4,749,581 A | 6/1988 | Gorsuch et al. |
| 4,753,215 A | 6/1988 | Kaminski et al. |
| 4,757,800 A | 7/1988 | Shei et al. |
| 4,781,169 A | 11/1988 | Henke et al. |
| 4,862,794 A * | 9/1989 | Lapeyre et al. .......... 99/443 C |
| 4,881,519 A | 11/1989 | Henke |
| 4,964,392 A | 10/1990 | Bruno et al. |
| 5,025,775 A | 6/1991 | Crisp |
| 5,072,663 A * | 12/1991 | Ellis-Brown ............... 99/331 |
| 5,184,538 A * | 2/1993 | Ledet ......................... 99/331 |
| 5,277,105 A | 1/1994 | Bruno et al. |
| 5,541,390 A * | 7/1996 | Pinceloup ................. 219/701 |
| 5,609,095 A * | 3/1997 | Lemke et al. ............. 99/468 |
| 6,157,002 A | 12/2000 | Schjerven, Sr. et al. |
| 6,252,201 B1 | 6/2001 | Nevarez |

* cited by examiner

*Primary Examiner*—S. Gravini
(74) *Attorney, Agent, or Firm*—Burr & Brown

(57) ABSTRACT

An object of the present invention is to provide a conveyer oven having a high heat efficiency and excellent cooking performance. Foods F are carried into a heating chamber 10 by a conveyer 60 and conveyed to the upper portion of the heating chamber. While the foods F are conveyed at the upper portion of the heating chamber, an eject nozzle 45 blows hot air to the foods F and simultaneously foods F are surrounded with remaining hot air. When cooking is finished, the foods F are conveyed downward to be carried out from the heating chamber 10. Therefore, heat from a heating means 20 is used effectively for cooking, that means heat efficiency is improved, which reduces fuel cost. Moreover, since the foods F are surrounded with remaining hot air, the foods F are evenly heated all over, whereby cooking performance is improved.

6 Claims, 2 Drawing Sheets

CONVEYER OVEN

This application claims the benefit of Japanese Patent Application Number 2003-66283 filed on Mar. 12, 2003, the entirety of which is incorporated by reference.

BACKGROUND OF THE INVENTION

1. Field of the Invention

The present invention relates to a conveyer oven for commercial use in which foods, such as a pizza, are placed on a conveyer and heated.

2. Description of the Related Art

Conventionally, in fast food stores, a conveyer oven is used for heating foods, such as a pizza.

The description of such a conveyer oven is disclosed in Japanese Patent Publication of Examined Application 3-3126. It includes a heating chamber for heating foods, a conveyer that penetrates the heating chamber horizontally for carrying the foods into the heating chamber, and a heating means provided in the heating chamber for heating the foods which are placed on the conveyer from the top and the bottom of the foods.

The foods are placed on the conveyer and carried into the heating chamber. While they are conveyed, the heating means blows hot air on the foods in order to heat the same. Quantity of caloric value and a conveying speed of a conveyer are set so that cooking is finished when the foods are carried out from the heating chamber.

In this kind of conveyer oven, a conveyer is set so that it penetrates the heating chamber horizontally. Therefore, an entrance port and an exit port are provided on the lateral side walls of the heating chamber.

However, since these two ports and a cooking area are provided at the same level, hot air blown on the foods directly escapes outside from the two ports. Therefore, it is difficult to utilize the hot air effectively, and the conveyer oven is unable to obtain high heat efficiency.

In addition, the temperature in the store rises due to this outflow of the hot air from the heating chamber. As a result, working environment becomes worse.

The present invention solves the above problems and provides a conveyer oven having high heat efficiency.

SUMMARY OF THE INVENTION

To solve the above problems, a conveyer oven as recited in a first aspect of the present invention includes a heating chamber for heating foods having an entrance port and an exit port on lateral side walls, a conveyer for carrying the foods into the heating chamber through the entrance port and carrying out the same from the heating chamber through the exit port, and a heating means for heating the foods conveyed by the conveyer in the heating chamber. Then, the foods are conveyed to the upper portion of the heating chamber after passing the entrance port and then conveyed downward to be carried out from the exit port.

According to a second aspect, a conveyer fryer as recited in the first aspect is provided, wherein the heating means blows hot air on the foods.

According to a third aspect, a conveyer fryer as recited in the first aspect is provided, wherein the heating means applies radiant heat to the foods.

According to a fourth aspect, there is provided a conveyer oven as recited in any one of the first to third aspects, wherein the conveyer conveys the foods upward with a height where at least the bottom surface of the foods is higher than the upper edge of the entrance port and the exit port.

In a conveyer oven according to the first aspect with the above configuration, the foods placed on the conveyer are conveyed upward when they enter the heating chamber. In the heating chamber, the heating means heats the foods and hot air generated from the heating remains at the upper portion of the heating chamber.

In this case, the foods are heated by both direct heating and the remaining hot air in the cooking chamber while moving through the upper portion of the heating chamber. In this way, it is possible to effectively use the remaining hot air in the heating chamber.

Moreover, the hot air surrounds and heats the foods evenly, thereby improving cooking efficiency.

It should be noted that it is not necessary to directly heat the foods by the heating means. That is, the heating means can be used as a means for generating hot air in the heating chamber and the foods are heated only by the remaining hot air in the heating chamber. Similarly, in this case the hot air generated from the heating means can be effectively used for heating and the foods are surrounded by the hot air for even heating.

In a conveyer oven as recited in the second aspect with the above configuration, the heating means blows hot air on the foods conveyed to the upper portion of the heating chamber. Then, the foods are heated by both a direct blow of the hot air and the remaining hot air in the heating chamber.

In a conveyer oven as recited in the third aspect with the above configuration, the heating means applies radiant heat to the foods. Then, the foods are heated by both the radiant heat and the remaining hot air in the heating chamber.

In a conveyer oven as recited in the fourth aspect with the above configuration, the foods are conveyed upward to a position where at least the bottom surface of the foods is higher than the upper edge of the entrance port and the exit port. As a result, the foods are surely disposed in the remaining hot air, so that the heating is conducted using the hot air efficiently.

DETAILED DESCRIPTION OF THE PREFERRED EMBODIMENTS

In order to clarify the configuration and the operation explained above, preferred embodiments of the present invention will be explained below.

Figure 1:
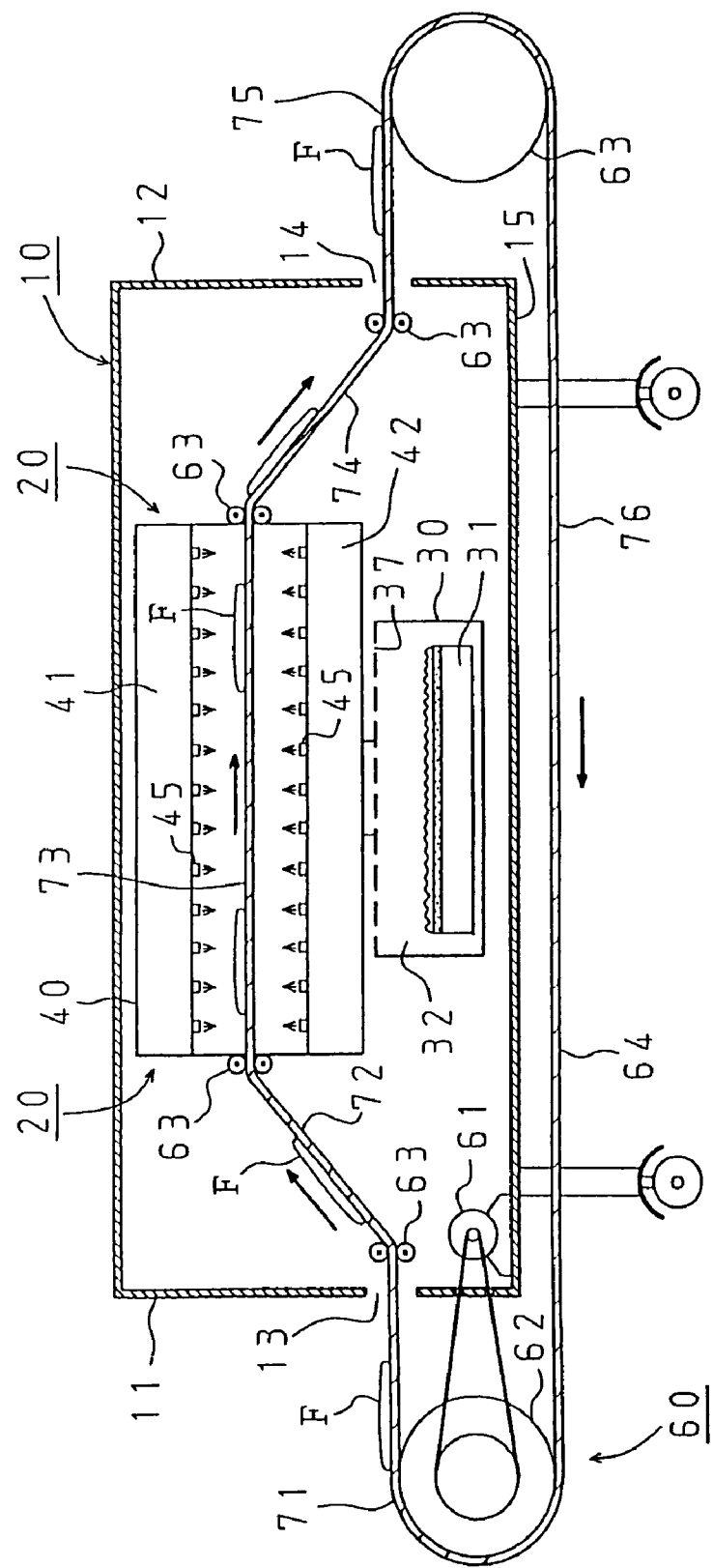
FIG. 1 is a lateral cross sectional view showing a configuration of a conveyer oven of the first embodiment.
Figure 2:
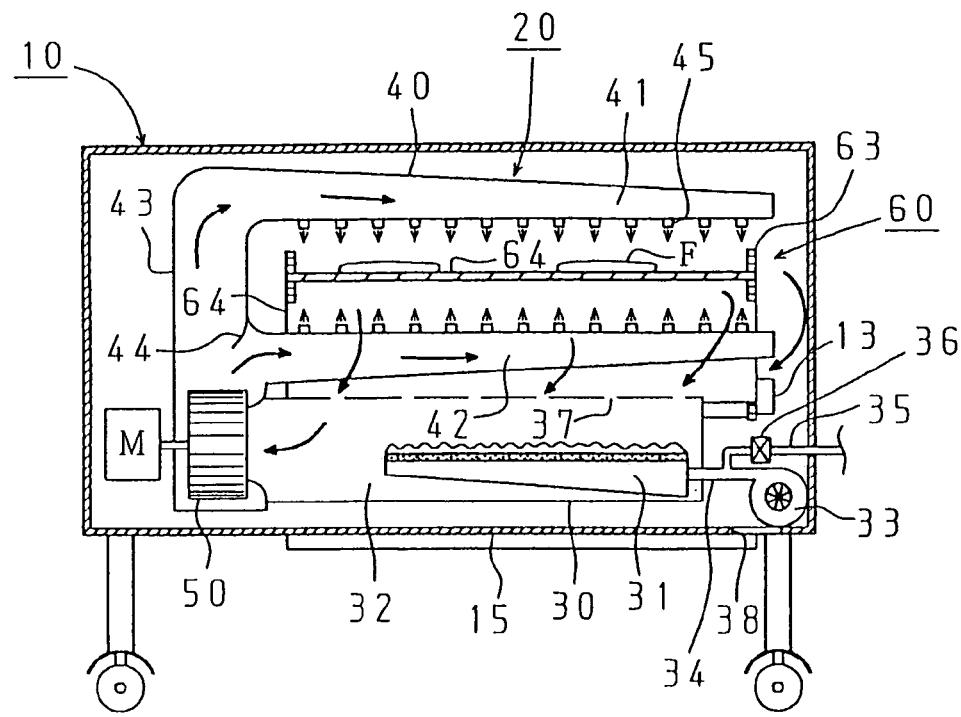
FIG. 2 is a front sectional view showing a configuration of a conveyer oven of the first embodiment.

FIG. 1 (a lateral sectional view) and FIG. 2 (a front sectional view) show a schematic structure of an embodiment of a conveyer oven. This conveyer oven is generally constituted of a heating chamber 10 serving as a heating area, a heating means 20 provided in the heating chamber for heating foods F, such as a pizza, and a conveyer 60 for carrying the foods F into the heating chamber 10.

The heating chamber 10 made of metal has a box shape. At a front and rear end of the heating chamber 10, a side wall 11 and a side wall 12 are provided. The side wall 11 has an entrance port 13 for carrying the foods F into the heating chamber 10, and the side wall 12 has an exit port 14 for carrying out the foods F from the heating chamber 10.

The heating means 20 has a combustion portion 30 for burning mixed gas including fuel gas and air, a hot air ejecting portion 40 for ejecting hot combustion air generated in the combustion portion 30 to the foods F, and a hot air blowing fan 50 for supplying hot combustion air generated in the combustion portion 30 to the hot air ejecting portion 40.

The combustion portion 30 has a burner 31 forming a plurality of flame ports on a ceramic plate for conducting all primary air combustion, a combustion chamber 32 for conducting combustion of the burner 31, a combustion fan 33 for supplying air for combustion to the burner 31, a gas supply tube 35 for mixing fuel gas with combustion air, and a gas control valve 36, such as an electromagnetic valve, for opening/closing the gas supply tube 35. The gas supply tube 35 is connected to an air supply tube 34 provided between the combustion fan 33 and the burner 31.

At the upper surface of the combustion chamber 32, a plurality of suction openings 37 which suctions hot air used for cooking for reuse is provided.

In addition, at a bottom end 15 of the heating chamber, an air suction opening 38 is provided adjacent to the combustion fan 33 which operates for suctioning combustion air from outside.

A hot air ejecting portion 40 has an upper chamber 41 and a lower chamber 42 in which a hot combustion air provided from a hot air blowing fan 50 is filled under pressurized state. The hot air ejecting portion 40 has a hot air duct 43 connecting the hot air blowing fan 50 to the upper chamber 41 and the lower chamber 42.

The hot air duct 43 has a guide plate 44 for distributing hot air provided from the hot air blowing fan 50 to the upper chamber 41 and the lower chamber 42 in a predetermined rate.

The upper chamber 41 and the lower chamber 42 have surfaces facing each other with an interval where the foods can be conveyed through. All over the facing surfaces, a plurality of eject nozzles 45 for ejecting hot air to the foods F is evenly provided.

By means of the conveyer 60, the foods F which are placed on the conveyer are carried into the heating chamber 10 and moved in a predetermined route so as to be carried out from the heating chamber 10. The conveyer 60 includes a motor 61 as a power resource, a driving roller 62 to which a driving force of the motor 61 is transmitted, a plurality of conveyance rollers 63 for setting a conveying route of foods F, and a conveyance belt 64 running between the driving roller 62 and the conveyance rollers 63 for placing the foods F.

Next, a conveyance route of the conveyer 60 will be explained with reference to FIG. 1.

The conveyer 60 constitutes a circuit conveyance route using the conveyance belt 64. The conveyance belt 64 includes the followings: an entrance route 71 running horizontally from a position where a user places the foods F to a position where the foods F are carried into the heating chamber 10, an upward slope 72 ascending from a position where the foods pass the entrance port 13 at the end of the entrance route 71, a cooking route 73 running horizontally between the upper and lower chambers 41, 42 from the top of the upward slope 72, a downward slope 74 descending from the end the cooking route 73 to a position adjacent to the exit port 14 of the heating chamber 10, an exit route 75 running horizontally from the lowest end of the downward slope 74 for carrying out the foods F from the heating chamber 10, and a returning route 76 running horizontally below the bottom surface 15 of the heating chamber 10.

The conveyance belt 64 is made of metal mesh and its both ends are supported by the conveyance rollers 63. At the surface of the conveyance belt 64, a plurality of projections (not shown) are provided so as to prevent the foods F from slipping off when they are passing the upward slope 72 and the downward slope 74.

Next, the operation of the conveyer oven will be explained.

To start cooking, a user starts the heating means 20 conducting with a predetermined operation in order to heat the heating chamber 10 in advance. With this operation, hot combustion gas generated from the burner 31 flows to the upper chamber 41 and the lower chamber 42 by means of the hot air blowing fan 50. Further the combustion gas is pressurized in the upper and lower chambers 41, 42 so as to be ejected through the ejecting nozzles 45. The ejected combustion gas (hot air) rises to the upper portion of the heating chamber 10 and remains there.

Then, after confirming that hot air is filled in the heating chamber 10, the user operates the conveyer 60 and places the foods F on the entrance route 71. The confirmation may be conducted by installing a temperature sensor in the heating chamber 10 and providing an alarm which notifies a time to carry the foods F when a temperature thereof reaches a predetermined degree.

The foods F placed on the entrance route 71 pass through the entrance port 13 and ascend the upward slope 72 to the upper portion of the heating chamber 10. Then the foods F pass through between the upper and lower chambers 41, 42 being conveyed on the cooking route 73.

On the cooking route 73, the foods F are heated by hot air ejected from the eject nozzles 45 and by being surrounded with remaining hot air in the heating chamber when the foods F are conveyed to the upper portion of the heating chamber 10.

After the hot air ejected from the eject nozzles 45 blows on the foods F, some of the hot air remains at the upper portion of the heating chamber 10, some of the hot air is suctioned to the combustion chamber 32 to be used repeatedly, and the rest of the hot air is cooled, and flows toward lower part of the heating chamber 10 to be discharged as exhaust gas from the entrance port 13 and the exit port 14.

Therefore, the hot air can be contributed sufficiently to heating of the foods F, whereby heat efficiency improves. In addition, as the foods F are completely surrounded with the remaining high temperature air, they are evenly heated and satisfactory cooked.

Moreover, the entrance port 13 and the exit port 14 are provided lower than a cooking area, and thus, the exhaust gas is cooled enough when it is discharged outside of the heating chamber since it applied sufficient heat to the foods F. As a result, a room temperature does not become high, whereby working environment improves. In addition, a fuel cost can be reduced, which makes it economical.

After passing the cooking route 73 for a predetermined time, the foods F are conveyed to the downward slope 74. It should be noted that cooking is finished while the foods are passing the cooking route 73. Then the cooked foods F are conveyed outside of the heating chamber 10 through the exit port 14, and picked up from the conveyer 60 by the user.

Figure 3:
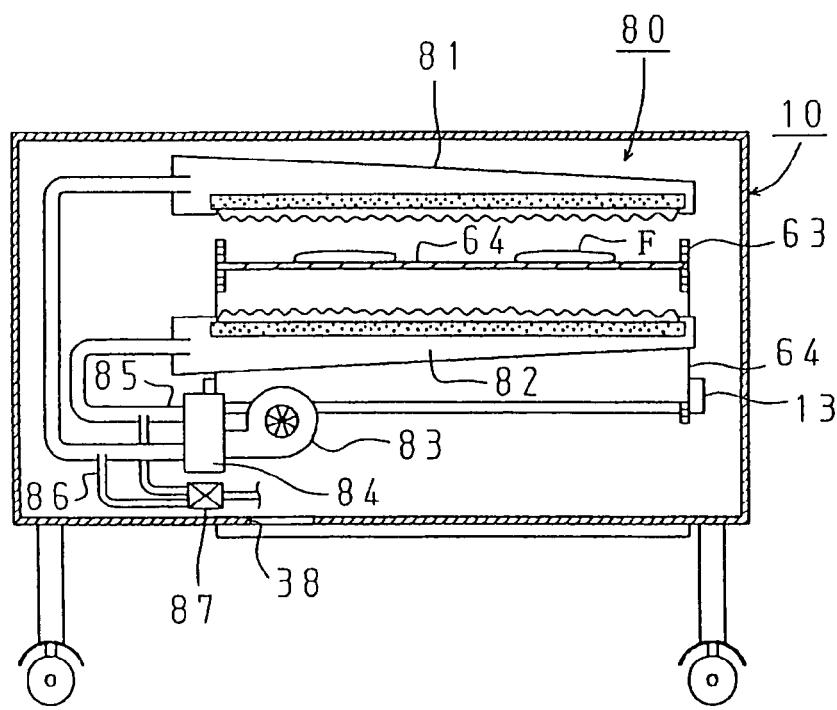
FIG. 3 is a front sectional view showing a configuration of a conveyer oven of the second embodiment.

Next, the second embodiment will be explained using FIG. 3. The second embodiment is almost the same as the prior embodiment, and the only difference is the heating means. Therefore, the same reference numbers are applied to the common structures and an explanation for them is omitted.

A heating means 80 in the second embodiment heats foods F by radiant heat. It includes an upper burner 81 and a lower burner 82 provided above and below the cooking route 73 of the conveyer 60 so that they are facing to each other, a combustion fan 83 for commonly supplying combustion air to the burners 81, 82, a distributor 84 for distributing the combustion air to the burners 81, 82 from the combustion fan 83, an air supply tube 85 for guiding the distributed combustion air to the burners 81, 82, a gas supply tube 86 for mixing fuel gas to the air supply tube 85, and a gas control valve 87 for opening/closing of the gas supply tube 86, such as an electromagnetic valve.

The upper burner 81 and the lower burner 82 are all primary air combustion burners each of which is made of ceramic plates facing each other and having a plurality of flame ports. Foods F are heated by both radiant heat from the ceramic plates and hot combustion gas.

Similarly to the first embodiment, in this conveyer oven of the second embodiment the foods F are conveyed to the upper portion of the heating chamber 10 and heated while passing the cooking route 73. However, instead of a direct blow of hot air, the foods are cooked by combustion gas and radiant heat from the upper and lower burners 81, 82.

Similarly to the first embodiment, in this case remaining hot air at the upper portion of the heating chamber 10 is also used for heating. As a result, several advantageous effects are obtained, such as improvement of cooking performance caused by even heating, improvement of heat efficiency, maintenance of a room temperature in a moderate range, reduction of fuel cost.

The embodiments of the present invention are thus explained, but this invention is not limited to the above embodiments and can be modified diversely without departing a scope of the present invention.

For example, the heating means may be configured so that it supplies only hot air into the heating chamber 10 without a direct blow of hot air to the surfaces of the foods F. In this case, the remaining hot air in the heating chamber 10 surrounds and heats the foods F.

It should be noted that a height where the foods are conveyed upward can be arbitrary set, but it is desirable to set the height where the bottom surface of the foods F are higher than the upper edge of the entrance port 13 and the exit port 14.

As described above, in a conveyer oven according to the present invention the foods are conveyed to the upper portion of the heating chamber and a cooking area is provided higher than the entrance/exit ports, which prevents the hot air from escaping directly from the entrance/exit ports. Moreover, remaining hot air in the heating chamber is also used for heating.

Therefore, heat is effectively used for cooking, that is, heat efficiency is improved, and it is economical.

Moreover, since the foods are surrounded with remaining hot air in the heating chamber, they are evenly heated all over, whereby cooking performance is improved.

In addition, hot air rarely escapes from the entrance/exit ports, so that a room temperature does not rise excessively, which prevents a deterioration of working environment.

What is claimed is:

1. A conveyer oven comprising:
   a heating chamber for heating foods having an entrance port and an exit port on lateral side walls thereof;
   a conveyer for carrying the foods into the heating chamber through the entrance port and carrying out the same from the heating chamber through the exit port;
   a heating means for heating the foods conveyed by the conveyer in the heating chamber; and
   a plurality of suction holes associated with said heating means for recirculating hot air within the chamber,
   wherein the foods are conveyed to the upper portion of the heating chamber after passing the entrance port, the heating means blows hot air on the food, and then the foods are conveyed downward to be carried out from the exit port.

2. A conveyer oven according to claim 1, wherein the heating means applies radiant heat to the foods.

3. A conveyer oven according to claim 1, wherein the conveyer conveys the foods upward with a height where the bottom surface of the foods is higher than the upper edge of the entrance port and the exit port.

4. A conveyer oven according to claim 1, wherein the conveyer conveys the foods upward with a height where the bottom surface of the foods is higher than the upper edge of the entrance port and the exit port.

5. A conveyer oven according to claim 2, wherein the conveyer conveys the foods upward with a height where the bottom surface of the foods is higher than the upper edge of the entrance port and the exit port.

6. A conveyer oven according to claim 1, wherein said heating means comprises a plurality of ejecting nozzles located at least above the conveyor in the heating chamber.

\* \* \* \* \*